G. W. HUEY.
MOTOR CONTROL SYSTEM.
APPLICATION FILED DEC. 31, 1913. RENEWED JULY 16, 1918.
1,308,589.
Patented July 1, 1919.
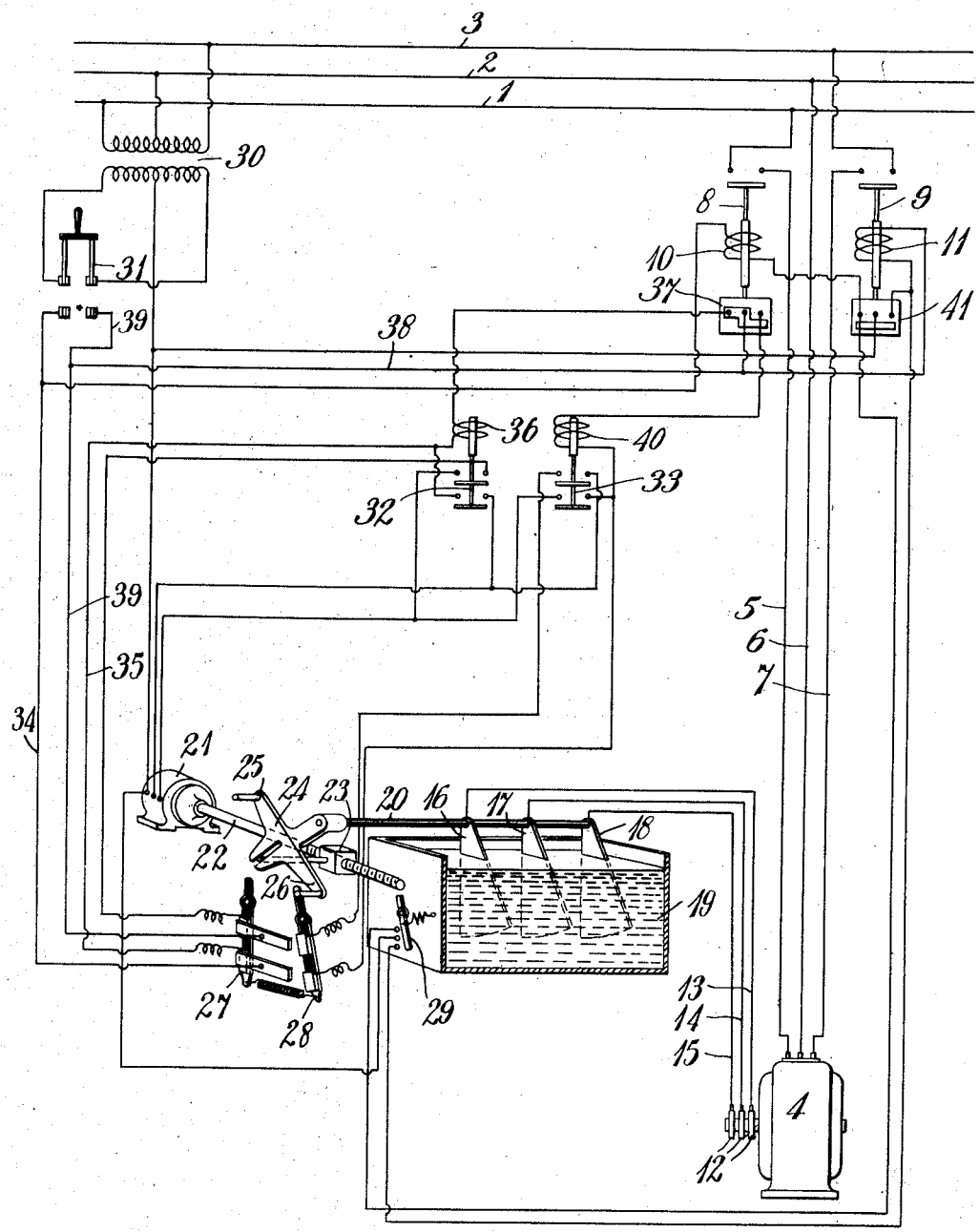

UNITED STATES PATENT OFFICE.

GEORGE W. HUEY, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,308,589.     Specification of Letters Patent.     Patented July 1, 1919.

Application filed December 31, 1913, Serial No. 809,640. Renewed July 16, 1918. Serial No. 245,237.

*To all whom it may concern:*

Be it known that I, GEORGE W. HUEY, a citizen of the United States, and a resident of Wilkinsburg, in the county of Allegheny and State of Pennsylvania, have invented a new and useful Improvement in Motor-Control Systems, of which the following is a specification.

My invention relates to motor-control systems, and it has for its object to provide a system for automatically controlling the operation of induction motors.

It is frequently necessary, in the operation of motors that may be employed to drive ventilating fans in mines, or for similar purposes, to locate the motors in places such that frequent visits are inconvenient and the constant presence of an attendant is undesirable.

I have provided a system of control by means of which an induction motor that is located in a place which is inconvenient of access or is at a considerable distance from the operating station, may be started and stopped at will by the manipulation of a single control switch. The system also comprises safety devices for insuring the existence of proper operating conditions before the motor is connected to a source of power.

My invention will be described in connection with the accompanying drawing in which the single figure is a diagrammatic view of circuits and apparatus embodying my invention.

The line conductors 1, 2 and 3, which may be connected to any suitable source of alternating current, supply energy to an induction motor 4 which may be located, for example, at the bottom of a ventilating shaft of a mine and which may be employed to operate a fan or blower. The primary windings of the motor 4 are connected to the line conductors 1, 2 and 3 by conductors 5, 6 and 7, respectively. Connection of the conductors 5 and 7 to the line conductors 1 and 3 is effected by magnetic switches 8 and 9 of the no-voltage type which have actuating coils 10 and 11.

The secondary windings of the main motor 4 are connected, through slip rings 12 and conductors 13, 14 and 15, to the respective plates 16, 17 and 18 of a liquid resistor 19. The plates 16, 17 and 18 are mounted upon a shaft 20 that is rocked by a mechanism comprising a small auxiliary motor 21, a screw threaded shaft 22, a traveling nut 23, and a crank arm 24 that has a pin and slot connection with the traveling nut 23. The crank arm 24 is provided with oppositely disposed arms 25 and 26 which respectively control limit switches 27 and 28. The traveling nut 23 operates, when at one end of its path of travel, to close a switch 29, which may be termed a reset switch. The switch 29, which is normally open and is closed only when resistance is inserted in circuit with the secondary winding of the main motor 4, controls the circuits of the coils 10 and 11 of the switches 8 and 9.

The motor 21 is supplied with energy from the line conductors 1, 2 and 3 through a suitable transformer 30 and circuits comprising a knife blade switch 31, limit switches 27 and 28 and relay switches 32 and 33.

The liquid resistor 19 and the mechanism for operating it may be arranged in any desired manner to form a compact unit which may be located near the main motor 4. The several switches 8 and 9 and 32 and 33 may also be mounted upon a suitable panel and placed adjacent the main motor 4. The transformer 30 and the knife blade switch 31 are the only parts of the system that are necessarily located at a distance from the motor 4 and the controlling mechanism.

The several parts of the system are illustrated in the positions respectively assumed by them when the main motor 4 is not operating. To start the main motor 4, the switch 31 is closed by the operator and single phase current then flows from one terminal of the transformer 30 through a conductor 34, limit switch 27, conductor 35, coil 36, interlocking switch 37 and conductor 38 to the conductor 39 which is connected to another terminal of the transformer. The coil 36 is thus energized to close the switch 32 and thereby complete the running circuit of the motor 21. The motor 21 then rotates in a clockwise direction to advance the nut 23 toward the end of the shaft 22 and thus rock the shaft 20. The resistor plates 16, 17 and 18, which are actuated upwardly, assume a substantially horizontal position when the nut 23 has reached the limit of its outward path of movement. At the same time, the limit switch 27 has been opened by the arm 25, the limit switch 28 has been allowed to close, and the reset switch 29 has been closed by the nut 23. The reset switch 29 has completed circuits comprising the actuating coils 10 and 11 of the switches 8 and 9 which, upon closing, complete the running circuits of the main motor 4 and close, also, the interlocking switches 37 and 41, which are respectively connected to the switches. The main motor starts while the resistance in circuit with the secondary winding is a maximum, that is, while the plates 16, 17 and 18 are nearly out of contact with the electrolyte.

The circuit comprising the coil 36 is broken by the limit switch 27 and a circuit is completed which comprises the actuating coil 40 of the switch 33, and the switch 37. The switch 33, upon closing, reverses the connections of the motor 21 and the latter then rotates in the opposite direction.

While the main motor 4 is attaining its normal speed, the plates of the resistor are being gradually inserted into the electrolyte to cut out the resistance in circuit with the secondary windings. When the nut 23 reaches the position illustrated, the limit switches 27 and 28, the reset switch 29 and the resistor plates have each assumed their respective positions as shown. The motor 21 will then stop because the circuit comprising the coil 36 cannot be completed through the switch 37 since the latter is in its upper position. The switch 41, upon closing, completes a short circuit for the reset switch 29 and thereby maintains the energization of the coils 10 and 11 which operate to hold the main switches 8 and 9 closed until the switch 31 is opened or the voltage of the supply circuit is decreased to a predetermined value. Should there be a failure in line voltage from any cause, the coils 10 and 11 would be de-energized, the switches 8 and 9 would open and the motor 4 would stop. Since the interlock 41 has opened the circuits of the coils 10 and 11, the motor 4 cannot be started again, until the cycle of operations above described has been repeated, thus insuring that the resistor 19 is always in the starting position before the main switches 8 and 9 can close.

To stop the motor 4 at will, it is only necessary to open the switch 31 and thereby break the circuits comprising the coils 10 and 11. The main switches 8 and 9 will then be opened by force of gravity and the motor 4 will be brought to a stop. To start the motor again, the switch 31 will be closed and the operation, as above described, will be repeated.

It will be noted that I have provided an arrangement for automatically inserting the starting resistance in the secondary circuit of an induction motor and have provided means for insuring that the motor circuits cannot be closed until the conditions necessary for safely starting the motor have been completed. I have provided, also, means for automatically restoring the system to normal running conditions as quickly as is consistent with safety.

I claim as my invention:

1. The combination with a main motor, a main switch therefor, and a resistor, of controlling means for said resistor having a normal position, when the main motor is at rest, in which the resistor is at its minimum value, said controlling means comprising an auxiliary motor, a control switch, and means, operable upon the closing of the control switch, for successively completing the circuit of said auxiliary motor for inserting said resistor in circuit, closing a control circuit for the main switch, and reversing said auxiliary motor for removing said resistor from circuit.

2. The combination with a main motor, a main switch therefor, and a resistor, of controlling means for said resistor having a normal position, when the main motor is at rest, in which the resistor is at its minimum value, said controlling means comprising an auxiliary motor, a reversing switch for said auxiliary motor, a control circuit for the main switch comprising a switch controlled by the auxiliary motor, and means, comprising a control switch, for successively operating said motor to insert said resistor in circuit, closing the control circuit for said main switch and thereby operating said reversing switch and rendering the motor-controlled switch inoperative.

3. The combination with a source of electric current, a main motor, a main switch for connecting said source to one of the windings of said motor, and a resistor in circuit with the other windings of said motor, of an auxiliary motor for controlling said resistor, said auxiliary motor having a normal inoperative position, when the main motor is at rest, in which the resistor is at a minimum value, means connected to said auxiliary motor for controlling said main switch, automatic means comprising electromagnetic switches for controlling said auxiliary motor and for stopping the same when the resistor is at a minimum value, and means connected to said main switch for controlling said electromagnetic switches.

4. The combination with a main motor, a main switch therefor, and a resistor, of controlling means for said resistor having a normal position, when the main motor is at rest, in which the resistor is at its minimum value, said controlling means comprising an auxiliary motor, means for limiting the rotation of said auxiliary motor in either direction, means controlled by said auxiliary motor for effecting the closing of said main switch when the resistor is at a maximum value, a switch connected to said main switch for reversing said auxiliary motor, and a controlling switch for governing the circuits of each of said motors.

5. The combination with a main motor, a main switch therefor, and a resistor, of an auxiliary motor for controlling said resistor, electromagnetic reversing switches for controlling the circuit of said auxiliary motor, means comprising a switch controlled by said main switch and limit switches actuated by said auxiliary motor for controlling said electromagnetic switches, and means comprising a controlling switch for effecting the opening of said main switch and for effecting the opening of said electromagnetic switches when the resistor is at its minimum value.

6. The combination with a source of electric current, a main motor, a main switch for connecting said source to one of the windings of said motor, and a resistor in circuit with the other windings of said motor, of an auxiliary motor for controlling said resistor, means connected to said auxiliary motor for controlling said switch, automatic means comprising electromagnetic switches for stopping the auxiliary motor when the resistor is at a minimum value, and means connected to said main switch for controlling said electromagnetic switches.

7. The combination with a source of electric current, a main motor, a switch for connecting said source to one of the windings of said motor and a resistor for the circuit of the other winding of said motor, of means for normally preventing the closing of said switch, an auxiliary motor for controlling said resistor, means connected to said auxiliary motor for permitting the closing of said switch, automatic means for stopping the auxiliary motor when the active portion of the resistor is a minimum and means connected to said switch for controlling said automatic means.

8. The combination with a main motor, a main switch therefor, and a resistor, of means for normally preventing the closing of said switch and controlling means for said resistor having a normal position when the main motor is at rest, in which the active portion of the resistor is a minimum, said controlling means comprising an auxiliary motor, a controlling switch and means, operable upon the closing of said controlling switch, for completing the circuit of said auxiliary motor to increase the portion of said resistor included in the circuit, rendering said preventing means permissive and, upon the closing of said main switch, operating said auxiliary motor for decreasing the portion of said resistor included in the circuit.

9. The combination with a main motor having a resistor, and a switch for said motor, of means for normally preventing the closing of said switch, an auxiliary motor, means for energizing said auxiliary motor to cause the same to increase the portion of said resistor included in the circuit of said main motor and to render said preventing means permissive, and means for automatically energizing said auxiliary motor to cause the same to decrease the portion of said resistor included in said main-motor circuit.

10. The combination with a main motor, a switch therefor, and a resistor in circuit with said motor, of means for normally preventing the closing of said switch, an auxiliary motor for controlling said resistor, means connected to said auxiliary motor for rendering said preventing means permissive, and means for stopping said auxiliary motor when the active portion of said resistor is a minimum, said stopping means being controlled by said switch.

11. The combination with a main motor having a resistor, of an auxiliary motor for controlling said resistor, switches for controlling the operation of said auxiliary motor, means for maintaining one of said switches closed and another of said switches open to cause said auxiliary motor to insert said resistor into circuit with said main motor before starting the same, and means for maintaining said other switch closed and said first switch open to cause said auxiliary motor to progressively decrease the active value of said resistor after the starting of said main motor.

12. The combination with an electric motor and controlling means therefor comprising a resistor having a normally minimum active resistance value and a switch, of a member to increase the resistance value of said resistor in circuit before starting said motor and for controlling said switch, and a switch controlled by said member for controlling said member.

13. The combination with an electric motor and controlling means therefor comprising a resistor and a switch, of a movable member, and means having a pin-and-slot connection with said movable member for inserting said resistor into circuit with said motor before starting said motor and for actuating said switch.

14. The combination with an electric motor and a controlling means therefor comprising two switches and a liquid resistor having a rocking plate, of a movable member for controlling one of said switches, and a member connected to said movable member and having portions for respectively rocking said plate and controlling said other switch.

15. The combination with a main motor having a liquid resistor comprising a rocking plate, and a switch for said motor, of a traveling nut for closing said switch, an auxiliary motor for actuating said nut, a pair of limit switches for said auxiliary motor, and a member having a pin-and-slot connection with said nut for rocking said plate and controlling said limit switches.

16. The combination with a main motor, of an auxiliary motor and a controller operated thereby to control said main motor, said controller having an initial position in which it is ineffective, and means whereby said position may be made to serve as a running position for said main motor.

17. The combination with a main motor, of an auxiliary motor and a controller operated thereby to control said main motor, said controller having an initial position in which it is normally ineffective, of means for operating said auxiliary motor through a complete cycle to start and accelerate said main motor, said initial position thereupon serving as a running position for said main motor.

18. The combination with a source of electric current, a main motor, an electromagnetic switch for connecting said main motor to said source, and a resistor for said main motor, of an auxiliary motor and a controller operated thereby to control said main motor, said controller having a definite cycle of operation and an initial position in which it is normally ineffective, and means for energizing said auxiliary motor to operate the controller through a complete cycle to close the circuit of said switch and to regulate said resistor, said initial position thereupon serving as the running position for said main motor.

19. The combination with a source of electric current, a main motor, an electromagnetic switch for connecting said main motor to said source, and a resistor for said main motor, of an auxiliary motor and a controller operated thereby to control said main motor, said controller having a definite cycle of operation and an initial position in which it is normally ineffective, means for energizing said auxiliary motor to actuate said controller through half a cycle to increase the resistance value of said resistor in circuit with said main motor and to close the circuit of said switch, and means whereby said auxiliary motor operates said controller through the remaining half cycle to decrease the active value of said resistor, said initial position thereupon serving as a running position for said main motor.

20. The combination with an electric motor having a resistor, and a switch for said motor, of means for closing said switch, a pair of limit switches for controlling said closing means, and means having a pin-and-slot connection with said closing means for controlling said resistor and said limit switches.

21. The combination with a main motor and a controller therefor having an initial position in which it is ineffective, of a pilot motor for actuating said controller through a complete cycle from said initial position to said initial position and means whereby said initial position may be made to serve as a running position for said main motor.

22. The combination with a main motor and a controller therefor having an initial position in which it is normally ineffective, of a pilot motor for actuating said controller through a complete cycle to start and accelerate said main motor, said initial position thereupon serving as the running position of said main motor.

In testimony whereof, I have hereunto subscribed my name this 23rd day of Dec. 1913.

GEORGE W. HUEY.

Witnesses:
HOWARD L. BEACH,
B. B. HINES.